Figure 1:
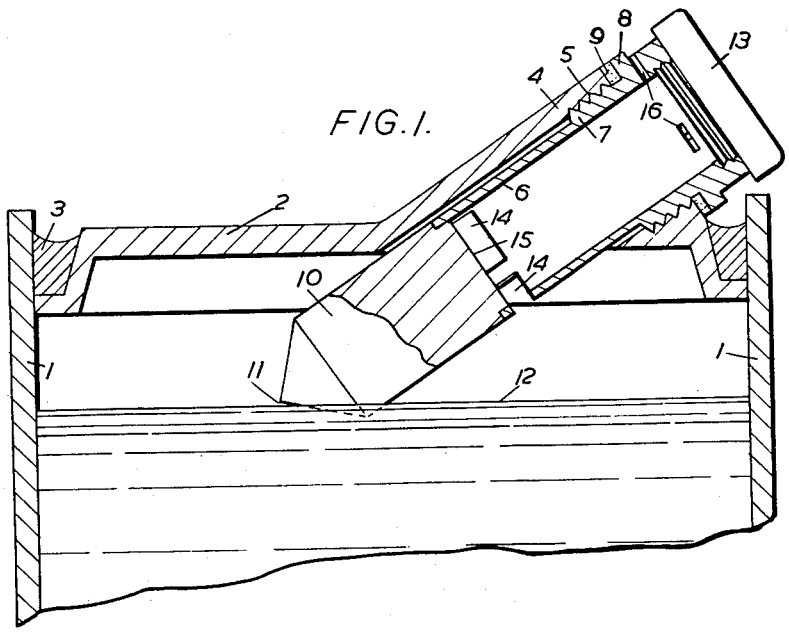

March 22, 1955     J. R. MARTIN     2,704,454

LIQUID LEVEL INDICATORS

Filed April 25, 1952

Inventor
John R. Martin,
By
Attorney

United States Patent Office 2,704,454
Patented Mar. 22, 1955

2,704,454

LIQUID LEVEL INDICATORS

John Ronald Martin, Denton, near Manchester, England, assignor to Oldham & Son Limited, Denton, near Manchester, England, a British company Application April 25, 1952, Serial No. 284,475

Claims priority, application Great Britain September 27, 1951

2 Claims. (Cl. 73—327)

The present invention relates to liquid level indicators and more particularly to indicators comprising a cylindrical transparent element having a conical end for insertion into a liquid and means to co-act with a container for liquid on relative angular movement between the indicator and container thereby to retain the indicator in position relative to the container.

A main object of the invention is to provide a liquid level indicator through which liquid can be filled into the container.

According to the invention, a transparent cylindrical level indicator for liquids has a tapered form at the lower end and interlocking means in the upper part by which the indicator is located on a container so that the tapered end normally dips into the liquid, the upper part of the indicator being tubular and being apertured whereby liquid can be filled into the container through the indicator.

According to another aspect of the invention, a liquid level indicator comprises a solid cylindrical transparent element having a conical end for insertion into a liquid, a funnel attached to said element in the region of the end thereof opposite said conical end and extending away from said conical end, the funnel having at least one aperture in the side thereof bounded in part by the end of the element opposite said conical end and through which liquid can be filled into a container to which the indicator is fitted, and means located between said aperture and the end of the funnel remote from said element to co-act with the container on relative angular movement between the indicator and container thereby to retain the indicator in position relative to the container.

According to a further aspect of the invention, a liquid level indicator comprises a cylindrical transparent element having a conical end for insertion into a liquid and a face substantially parallel with the base of the cone, a tube attached to said element in the region of said face and extending away from said conical end, the tube having at least one aperture in the side thereof bounded in part by said face and through which liquid can be filled into a container to which the indicator is fitted, and means located between said aperture and the end of the tube remote from said element to co-act with the container on relative angular movement between the indicator and the container thereby to retain the indicator in position relative to the container.

A removable transparent cap may be provided for the open end of the funnel or tube, and the funnel or tube have at least one vent opening between the level of the retaining means and the cap.

Figure 2:
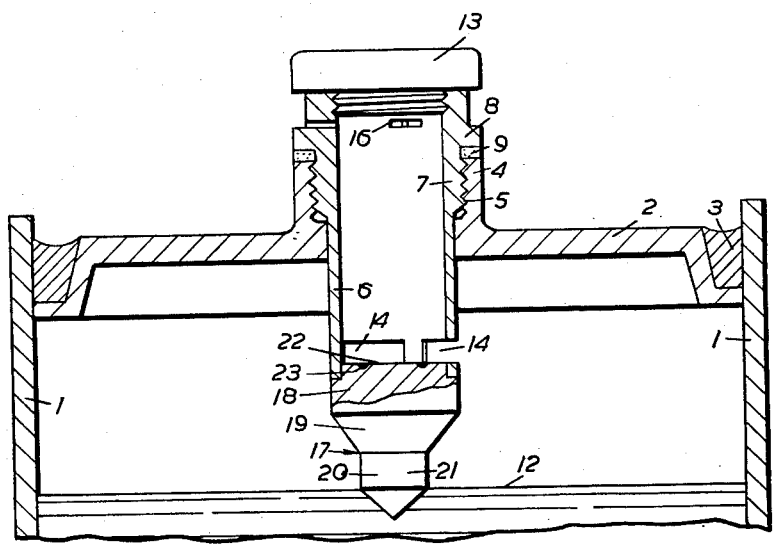

In order that the invention may be more clearly understood two embodiments thereof (each as applied to an accumulator) will now be described by way of example with reference to the accompanying drawings, in which:

Figure 1 shows in sectional elevation an electrolyte level indicator obliquely disposed in an electrical accumulator, and Figure 2 shows in sectional elevation an electrolyte level indicator disposed vertically in an electrical accumulator.

The casing of the accumulator illustrated in Figure 1 comprises, in known manner, integral bottom and side walls, of which only the side walls 1 are shown, and a cover 2 sealed to the walls 1 by a bitumen packing 3. The cover 2 is formed with an obliquely disposed mouth 4 within which screw threads 5 are formed.

The electrolyte level indicator comprises a cylindrical transparent element 10, having a conical end for insertion into the electrolyte and a face 15 substantially parallel with the base of the cone. A funnel or tube 6 is attached to the element 10 in the region of the face 15 thereof and extends away from the conical end. The tube 6 has at least one aperture 14 in the side thereof bounded in part by the face 15 and through which distilled water or electrolyte can be filled into the casing to which the indicator is fitted. Means, for example a screw-threaded portion 7, is located between the aperture 14 and the end of the tube 6 remote from the element 10 to co-act with the casing on relative angular movement between the tube and the casing, thereby to retain the tube in position relative to the casing.

The tube 6 constitutes an upper tubular part of an indicator and is located in the accumulator cover 2 by the screw-threaded portion 7, which engages into the screw-threaded mouth 4. The arrangement of the mouth 4 is such that the axis of the tube 6, when in position therein, is disposed at about 30° to the horizontal. Around the outer end of the tube 6 is formed a flange 8 against which is located a washer 9, which, as the tube is screwed tightly into position, seals the mouth 4.

The apex 11 of the cone lies on the axis of the indicator, and the cone angle is preferably 45° as shown.

The size of the element 10 is such that, when the indicator is located in the cover 2, the conical end of the element 10 normally dips into the electrolyte, the correct level of which is indicated at 12, and coincides with the apex 11 of the cone.

The open end of the tube 6 is closed by a removable transparent cap 13, which is shown as screwed into the open end, but may be, for example, a push fit therein.

The element 10 and cap 13 are made of glass or of a transparent industrial plastic inert to the electrolyte, and the tube 6 is made of an opaque material, also inert to the electrolyte.

The apertures 14 in the tube 6 consist of three circumferential slots 14 extending around the major portion of the periphery of the tube and the lower edges of the slots lie in the plane of the upper face 15 of the tapered part 10. Three small radial vent openings 16 are also provided in the tube 6 between the screw-threaded portion 7 and the cap 13.

In use, the level of the electrolyte in the accumulator is observed through the tube by means of the element 10 in the manner described in my co-pending patent application Serial No. 206,026, now Patent No. 2,665,327. If insufficient electrolyte is present, the cap 13 is removed and distilled water or electrolyte poured into the tube 6, from which it escapes into the electrolyte in the accumulator through the slots 14. During the filling operation, the operator may observe the rise in level of the electrolyte by means of the element 10.

When the level of electrolyte has been corrected, pouring is discontinued, and the transparent cap 13 is replaced. Any subsequent accumulation of gas within the accumulator casing is avoided since the interior of the casing remains in communication with the atmosphere through the slots 14, tube 6 and vent openings 16.

The accumulator illustrated in Figure 2 has a casing similar to that illustrated in Figure 1, with the exception that the mouth 4 is vertically disposed in the cover 2. The cover 2 is sealed to the side walls 1 by the bitumen packing 3. Screw threads 5 are formed within the mouth 4 to co-act with a screw threaded portion 7 of a tube or funnel 6. The mouth 4 is sealed by a washer 9 located between the mouth and a flange 8 on the tube 6.

The tube 6 at its lower end has attached thereto a transparent cylindrical element 17, which has a conical end for insertion in the electrolyte. The element 17 is of stepped form and, in order from the top, consists of a cylindrical portion 18, a truncated conical portion 19, a cylindrical portion 20 and a conical portion 21.

The apex 11 of the cone lies on the axis of the indicator, and the cone angles of the conical portions are the same and preferably 45° as shown. The cylindrical portion 20 may be replaced by a truncated conical portion having a very small cone angle, for example, 5°.

The construction of the indicator is such that, when located in the cover 2, the conical end of the element 17 normally dips into the electrolyte, the level of which is indicated at 12, and which should correctly lie on the cylindrical portion 20.

The upper face 22 of the element 17 has an annular groove 23, filled with pigment, the diameter of the groove being equal to the diameter of the image produced on the upper face 22 when the level of the electrolyte is correct.

The tube 6 is apertured just above the transparent element 17. The apertures consist of three circumferential slots 14 extending around the major portion of the periphery, and the lower edges of the slots lie in the plane of the periphery of the upper face 22 of the element 17 so that the apertures are bounded in part by that face. Three small radial vent openings 16 are also provided in the tube 6 between the screw-threaded portion 7 and a transparent cap 13 closing the open end of the tube 6.

The indicator shown in Figure 2, is used in a manner similar to that already described in connection with the indicator shown in Figure 1, with the exception that the rise in level of the electrolyte is observed in the manner described in my copending patent application Serial No. 251,255.

The element 17 may have an upper face 22 of convex shape to facilitate the passage of electrolyte or distilled water poured into the accumulator from off the face 22.

The constructions described enable an accumulator to be made having but one mouth for venting, topping up and electrolyte level indication.

As will be understood the invention is applicable to the indication of liquid level in any container for example, in a fuel tank.

I claim:

1. A liquid level indicator, comprising the combination of an open-ended tube adapted to be mounted to extend downwardly into the interior of a container for liquid subject to level fluctuations, said tube having at least one filling opening in the wall thereof near its lower end, and a cylindrical transparent element, having a conical lower end for insertion into the liquid and an upper face substantially parallel with the base of the cone, said element being secured to the tube with said upper face closing the open lower end of the tube and bounding in part said lateral aperture; said tube, filling opening and upper face of the transparent element forming a funnel through which liquid can be filled into the container to which the indicator is fitted.

2. A liquid level indicator, comprising the combination of an open ended tube adapted to be mounted to extend downwardly through an opening in a cover of a container for liquid subject to level fluctuations into the interior of the container, said tube having at least one filling opening in the wall thereof near its lower end and at least one vent opening being provided in said tube near its upper end, a removable transparent cap for the upper end of the tube, said vent opening being positioned so as not to be obturated by said cap, and a cylindrical transparent element, having a conical lower end for insertion into the liquid and an upper face substantially parallel with the base of the cone, said element being secured to the tube with said upper face closing the open lower end of the tube and bounding in part said lateral aperture; said tube, filling opening and upper face of the transparent element forming a funnel through which liquid can be filled into the container to which the indicator is fitted.

References Cited in the file of this patent

UNITED STATES PATENTS

| Number | Name | Date |
|---|---|---|
| 1,867,564 | Ford | July 19, 1932 |
| 2,123,479 | Spencer | July 12, 1938 |
| 2,235,617 | Klinzing | Mar. 18, 1941 |
| 2,554,557 | Brown et al. | May 29, 1951 |